US012658553B2

(12) United States Patent
Kim et al.

(10) Patent No.: US 12,658,553 B2
(45) Date of Patent: Jun. 16, 2026

(54) THIN FILM TYPE RESONATOR AND DESIGN METHOD THEREOF

(71) Applicant: KOREA ELECTRONICS TECHNOLOGY INSTITUTE, Seongnam-si (KR)

(72) Inventors: Jin Hyoung Kim, Uiwang-si (KR); Cheol Ung Cha, Seoul (KR); Kwon Hong Lee, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 154 days.

(21) Appl. No.: 18/405,299

(22) Filed: Jan. 5, 2024

(65) Prior Publication Data

US 2024/0322416 A1 Sep. 26, 2024

(30) Foreign Application Priority Data

Mar. 23, 2023 (KR) ........................ 10-2023-0037925

(51) Int. Cl.

*H01P 7/08* (2006.01)
*H01P 1/203* (2006.01)
*H01P 11/00* (2006.01)

(52) U.S. Cl.

CPC .......... *H01P 7/082* (2013.01); *H01P 1/20381* (2013.01); *H01P 11/008* (2013.01)

(58) Field of Classification Search

CPC .. H01P 7/082; H01P 7/084; H01P 7/08; H01P 1/203; H01P 1/20354; H01P 1/20381

See application file for complete search history.

(56) References Cited

U.S. PATENT DOCUMENTS

2021/0249179 A1* 8/2021 Moon ................. H01F 27/2823

FOREIGN PATENT DOCUMENTS

| | | |
|---|---|---|
| KR | 10-2014-0072796 A | 6/2014 |
| KR | 10-1906365 B1 | 10/2018 |
| KR | 10-2019-0129671 A | 11/2019 |

OTHER PUBLICATIONS

Notice of Allowance dated Jan. 5, 2025 in Korean Patent Application No. 10-2023-0037925 in 10 pages.

Office Action received in Korean Patent Application No. 10-2023-0037925 dated Aug. 23, 2024 in 9 pages.

* cited by examiner

*Primary Examiner* — Stephen E. Jones

(74) *Attorney, Agent, or Firm* — Knobbe, Martens, Olson & Bear, LLP

(57) ABSTRACT

A thin film type resonator used in a wireless power transmission system is proposed together with a design method thereof. The thin film type resonator may include a thin film line formed in a spiral shape. The thin film line may have a form factor in which a width and a pitch of the thin film line gradually increase from an innermost portion to an outermost portion.

5 Claims, 13 Drawing Sheets

Quality factor by w & s (@ n=7)

| w | s | R | L | Q |
|---|---|---|---|---|
| 1mm | 5mm | 1.58Ω | 2.5uH | 67.37 |
| 2mm | 4mm | 1.07Ω | 2.32uH | 92.31 |
| 3mm | 3mm | 0.77Ω | 2.2uH | 121.65 |
| 4mm | 2mm | 0.81Ω | 2.12uH | 111.44 |
| 5mm | 1mm | 0.9Ω | 1.95uH | 92.25 |

| Quality factor by k & d | | | | |
|---|---|---|---|---|
| k | b | R | L | Q |
| 10.5 | 7mm | 0.7Ω | 1.8uH | 109.48 |
| 10.2 | 9.2mm | 0.95Ω | 2.32uH | 103.98 |
| 12.6 | 9.5mm | 1.3Ω | 3.83uH | 125 |
| 9.3 | 9mm | 0.75Ω | 2.3.uH | 130.57 |
| 11 | 11mm | 0.87Ω | 2.79uH | 137.54 |
| 11.11 | 10mm | 1Ω | 3.48uH | 148.17 |
| 11.97 | 11.5mm | 1.15Ω | 3.55uH | 131.4 |
| 12.5 | 12mm | 1.2Ω | 3.84uH | 136.25 |
| 8.9 | 12.5mm | 0.84Ω | 2.45uH | 124 |

FIG. 12A

| Coil resonator (Rx) | | | |
|---|---|---|---|
| TYPE | R | L | Q |
| c1 | 4.6Ω | 11.6uH | 107.37 |
| c2 | 18.7Ω | 44uH | 100.18 |
| c3 | 6.4Ω | 17uH | 113 |

FIG. 12B

| Printed resonator (Rx) | | | |
|---|---|---|---|
| TYPE | R | L | Q |
| p1 | 0.77Ω | 2.2uH | 121.65 |
| p2 | 0.67Ω | 2.16uH | 137.26 |
| p3 | 1Ω | 3.48uH | 148.17 |

FIG. 12C

| Printed resonator (Tx) | | | |
|---|---|---|---|
| TYPE | R | L | Q |
| t1 | 3.1Ω | 10.8uH | 143.7 |
| t2 | 12Ω | 15.8uH | 56.06 |
| t3 | 47Ω | 35uH | 31.7 |

THIN FILM TYPE RESONATOR AND DESIGN METHOD THEREOF

CROSS REFERENCE TO RELATED APPLICATIONS

The present application claims priority to Korean Patent Application No. KR 10-2023-0037925 filed Mar. 23, 2023, the entire contents of which are incorporated herein for all purposes by this reference.

BACKGROUND

Technical Field

The present disclosure relates to a resonator used in a wireless power transmission system.

Description of Related Technology

Resonators may be classified into coil type resonators and thin film type resonators. The coil type resonator requires a very sophisticated winding machine for mass production. Compared to the coil type resonator, the thin film type resonator has a small cross-sectional area, which results in disadvantages of a high resistance value and a low quality factor. However, the thin film resonator has an advantage of being able to be mass-produced through a typical, inexpensive printed circuit board (PCB) process. In addition, as manufactured in a film form, the thin film type resonator has an advantage of being convenient to be applied to various information technology (IT) devices.

SUMMARY

One aspect is a thin film type resonator implemented in a tapered and unequal shape to have an improved quality factor, and a method of designing the same.

Another aspect is a thin film type resonator with improved quality factor, and a design method thereof, by forming a thin film line of the thin film type resonator in a spiral shape and implementing it in a tapered and unequal shape.

Another aspect is a thin film type resonator that includes a thin film line formed in a spiral shape. The thin film line has a form factor in which width and pitch of the thin film line gradually increase from an innermost portion to an outermost portion.

The thin film type resonator may be formed on a substrate.

The substrate may include a printed circuit board (PCB).

The thin film type resonator may have any one of circular, rectangular, and polygonal outlines.

The width and pitch of the thin film line may be increased at same rate from the innermost portion to the outermost portion.

Thickness of the thin film line may be maintained constant from the innermost portion to the outermost portion.

Another aspect is a method of designing a thin film type resonator with a spiral thin film line that includes a user setting information input step in which a resonator design calculator enters user setting information for designing the thin film type resonator through a user interface; a basic form factor setting step in which the resonator design calculator sets a basic form factor of the thin film type resonator that satisfies the user setting information; and a tapered unequal resonator form factor setting step in which the resonator design calculator sets a tapered unequal resonator form factor by using an optimal width/pitch ratio for the thin film type resonator calculated as a result of the basic form factor setting step.

The user setting information may include an outermost diameter of the thin film type resonator.

The basic form factor setting step may include an outermost radius setting step in which the resonator design calculator sets an outermost radius of the thin film type resonator that satisfies the user setting information; a step of setting a sum of width and pitch in which the resonator design calculator sets the sum of width and pitch to be constant so that the outermost radius of the thin film type resonator does not change according to changes in width and pitch; a quality factor simulation step in which the resonator design calculator performs a quality factor simulation according to changes in the width and pitch of the thin film type resonator; and an optimal width/pitch ratio calculation step in which the resonator design calculator calculates an optimal width/pitch ratio for the thin film type resonator.

The tapered unequal resonator form factor setting step may include a width and pitch substitution step in which the resonator design calculator substitutes width and pitch values in a 1:1 ratio to a calculation result of the optimal width/pitch ratio; a step of calculating an optimal quality factor according to an unequal factor in which the resonator design calculator calculates the optimal quality factor while changing the unequal factor; a step of calculating the optimal quality factor according to an innermost radius in which the resonator design calculator calculates the optimal quality factor while changing the innermost radius; and an unequal factor and innermost radius determination step in which the resonator design calculator determines the unequal factor and the innermost radius that satisfy the optimal quality factor.

The thin film type resonator according to the present disclosure has the following effects.

First, the thin film type resonator implemented in a tapered form can improve the quality factor within a given form factor.

Second, the thin film type resonator having an improved quality factor can improve power transfer efficiency to the level of the coil type resonator.

BRIEF DESCRIPTION OF THE DRAWINGS

FIG. 12A, FIG. 12B, and FIG. 12C show tables showing parasitic components and quality factors according to form factor.

DETAILED DESCRIPTION

Figures 1, 2:
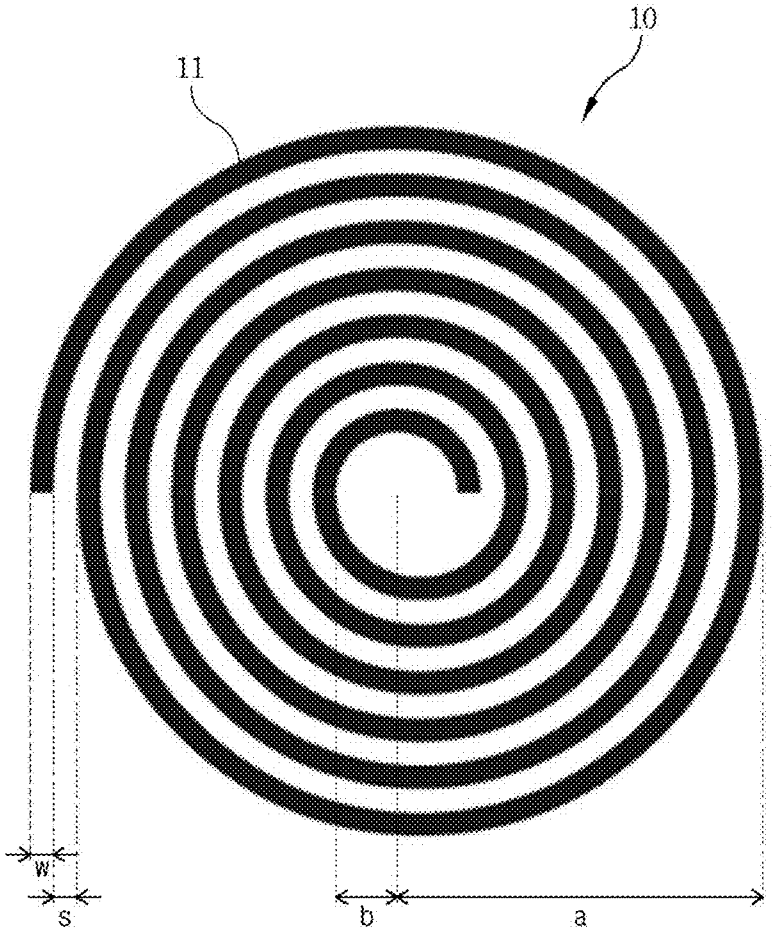
FIG. 1 Prior Art
FIG. 2 Prior Art
FIG. 1 is a schematic diagram showing a thin film type resonator.
FIG. 2 is a table showing experimental results on the quality factor of the thin film type resonator of FIG. 1.

FIG. 1 is a schematic diagram showing a conventional thin film type resonator. Referring to FIG. 1, the thin film type resonator 10 has a thin film line 11 in a spiral shape. The thin film line 11 has a form factor in which its width (W) and pitch (S) are equal from the innermost portion (b) to the outermost portion (a).

FIG. 2 is a table showing experimental results on the quality factor of the thin film type resonator 10. For example, the quality factor of a thin film resonator with a width (W) and pitch (S) of the thin film line 11 of 3 mm was measured to be 121.65.

Figure 3A:
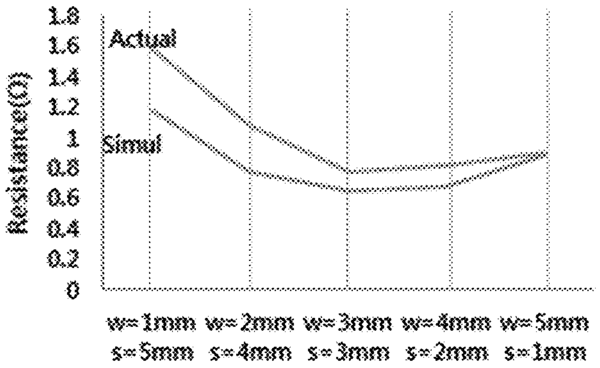
FIG. 3A Prior Art
FIG. 3A, FIG. 3B, and FIG. 3C are graphs showing changes in resistance, inductance, and quality factor according to form factor in the thin film type resonator of FIG. 1.
Figure 3B:
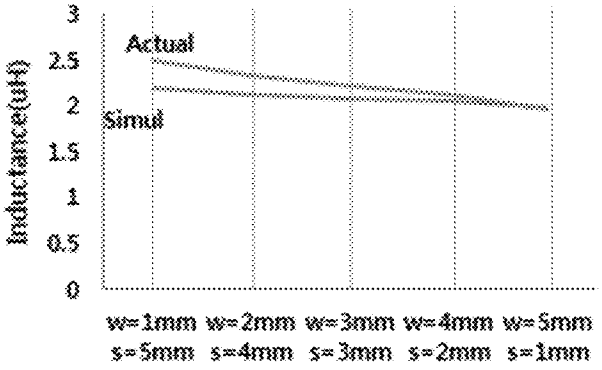
FIG. 3B Prior Art
Figure 3C:
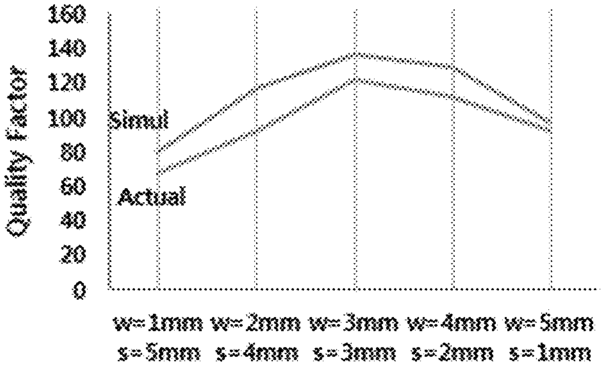
FIG. 3C Prior Art

FIG. 3A, FIG. 3B, and FIG. 3C are graphs showing changes in resistance, inductance, and quality factor according to form factor in the thin film type resonator 10. It can be seen that in the case of resistance and inductance, the actual value (Actual) appears higher than the simulation value (Simul), and in the case of quality factor, the actual value (Actual) appears lower than the simulation value (Simul).

The above thin film type resonator has a low quality factor according to form factor, making it difficult to fully demonstrate its performance as a resonator. In particular, when this resonator is applied to a resonance-type wireless power transmission system, the quality factor has a significant impact on power transfer efficiency. Therefore, the above thin film type resonator has a problem in that it cannot achieve high power transfer efficiency due to the low quality factor.

Now, embodiments of the present disclosure will be described in detail with reference to the accompanying drawings. However, in the following description and the accompanying drawings, well known techniques may not be described or illustrated in detail to avoid obscuring the subject matter of the present disclosure. Through the drawings, the same or similar reference numerals denote corresponding features consistently.

The terms and words used in the following description, drawings and claims are not limited to the bibliographical meanings thereof and are merely used by the inventor to enable a clear and consistent understanding of the disclosure. Thus, it will be apparent to those skilled in the art that the following description about various embodiments of the present disclosure is provided for illustration purpose only and not for the purpose of limiting the disclosure as defined by the appended claims and their equivalents.

Figure 4:
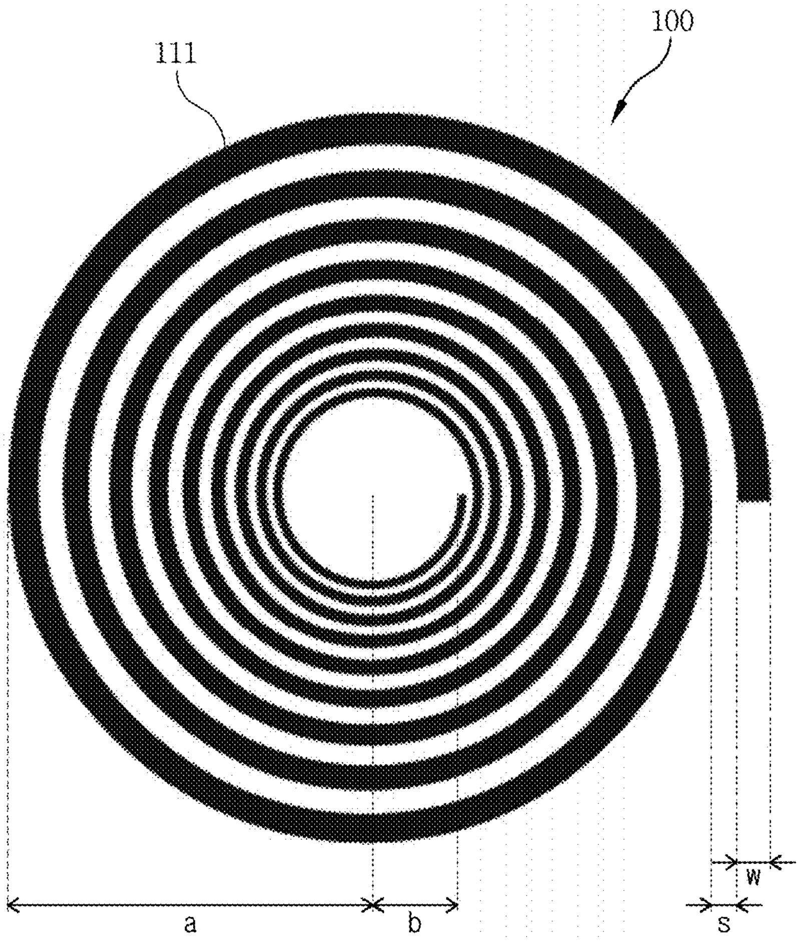
FIG. 4 is a schematic diagram showing a thin film type resonator according to an embodiment of the present disclosure.

FIG. 4 is a schematic diagram showing a thin film type resonator according to an embodiment of the present disclosure. FIGS. 5 to 14 are diagrams related to experimental results of the thin film type resonator according to an embodiment of the present disclosure.

Referring to FIG. 4, the thin film type resonator 100 according to the present disclosure includes a thin film line 111 formed in a spiral shape. The thin film line 111 has a form factor in which its width (W) and pitch (S) gradually increase from the innermost portion (b) to the outermost portion (a).

The thin film type resonator 100 may be manufactured on a substrate, for example, a printed circuit board (PCB).

The outline of the thin film type resonator 100 is not particularly limited and may have various outlines. For example, the thin film type resonator 100 may have any one of circular, rectangular, and polygonal outlines. In the description, the thin film type resonator 100 is described by taking a circular outline as an example.

In the thin film type resonator 100, the width (W) and pitch (S) of the thin film line 111 may be increased at the same rate from the innermost portion (b) to the outermost portion (a).

Alternatively, the width (W) and pitch (S) of the thin film line 111 in the thin film type resonator 100 may be increased at different rates from the innermost portion (b) to the outermost portion (a).

In the thin film type resonator 100, the thickness of the thin film line 111 may be maintained constant from the innermost portion (b) to the outermost portion (a) or may vary.

The thin film type resonator 100 according to the present invention configured as described above will be described hereinafter with reference to FIGS. 5 to 14.

The thin film type resonator 100 generates resonance in a specific target frequency band. In particular, because of the characteristic form factor in which the thin film line 111 has width (W) and pitch (S) gradually increasing from the innermost portion (b) to the outermost portion (a) as well as being formed in a spiral shape, the thin film type resonator 100 has a high quality factor.

The width (W) and pitch (S) of the thin film line 111 can be set to have a high quality factor based on electrical characteristics of each form factor. Accordingly, the thin film type resonator 100 can have a higher quality factor at the same size compared to a conventional thin film type resonator.

Figures 5, 6:
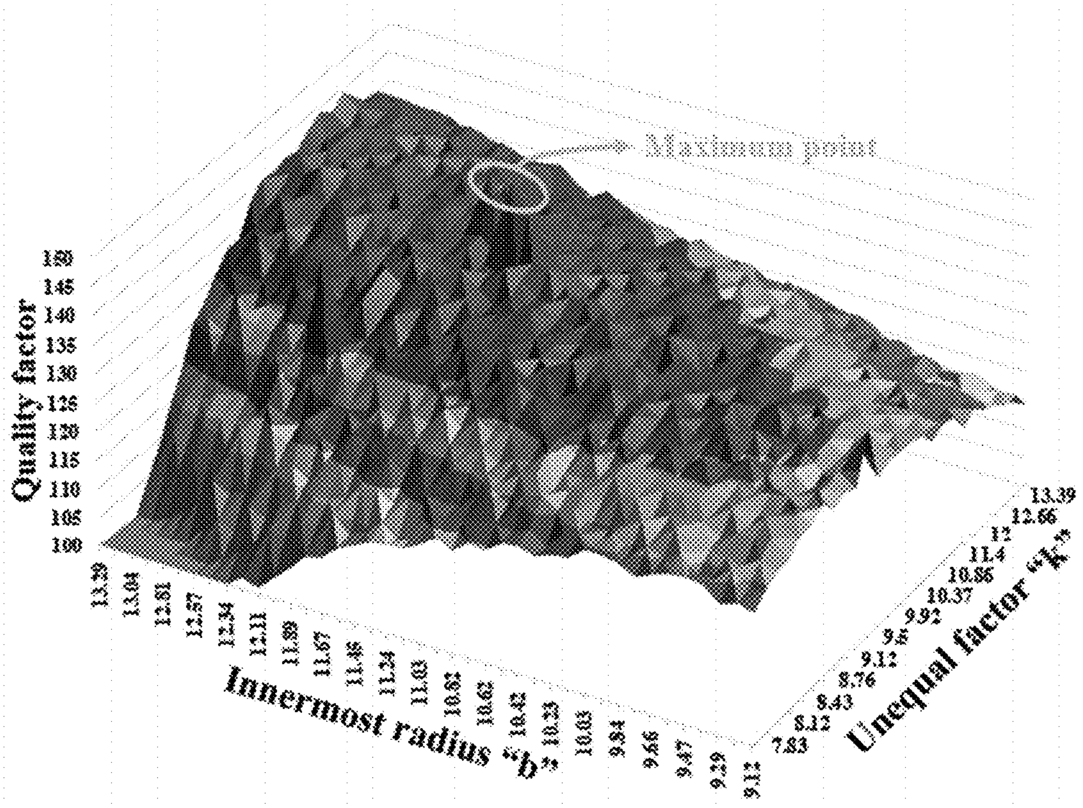
FIG. 5 is a table showing experimental results on the quality factor of the thin film type resonator according to an embodiment of the present disclosure.
FIG. 6 is a diagram showing the quality factor determined by the unequal factor and the innermost radius defined in the thin film type resonator according to an embodiment of the present disclosure.

FIG. 5 is a table showing experimental results on the quality factor (Q) of the thin film type resonator 100 according to an embodiment of the present disclosure. It can be seen that the quality factor of the thin film type resonator 100 is improved by about 22% compared to the conventional thin film resonator.

FIG. 6 is a diagram showing the quality factor determined by the unequal factor (k) and the innermost radius (b) defined in the thin film type resonator 100 according to an embodiment of the present disclosure. The unequal factor (k) can be expressed as Equation 1 below.

$$k = d/w \quad \text{[Equation 1]}$$

Here, 'd' refers to the distance between the center of the thin film type resonator 100 and the thin film line 111, and 'w' refers to the width of the thin film line 111.

FIG. 6 shows that the quality factor becomes maximum (Q=149) under conditions (k=11, b=11) similar to the experimental results. In addition, as shown, the width (w) and pitch (s) of the thin film line 111 are closely related to the quality factor.

Figure 7A:
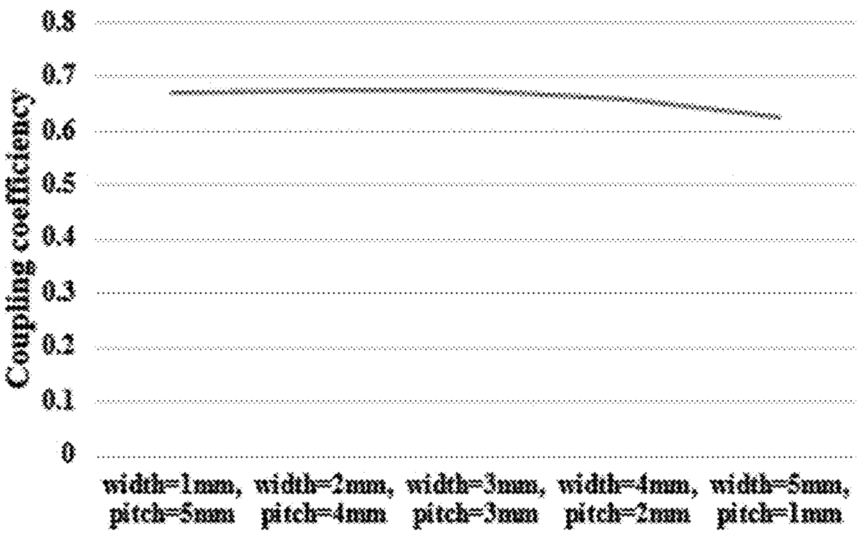
FIG. 7A and FIG. 7B are graphs showing the relationship between the form factor and the coupling coefficient in the thin film type resonator according to an embodiment of the present disclosure.
Figure 7B:
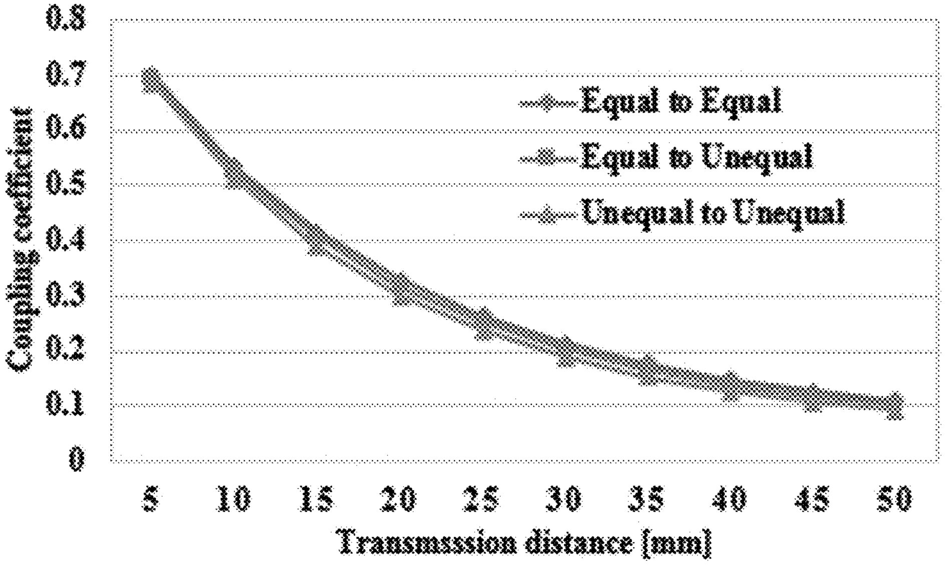

FIG. 7A and FIG. 7B are graphs showing the relationship between the form factor and the coupling coefficient in the thin film type resonator 100 according to an embodiment of the present disclosure. It can be seen that even if the form factor changes, there is no significant effect on the coupling coefficient between the transmitting and receiving resonators. Also, it can be seen that there is no significant effect depending on the distance.

Figure 8:
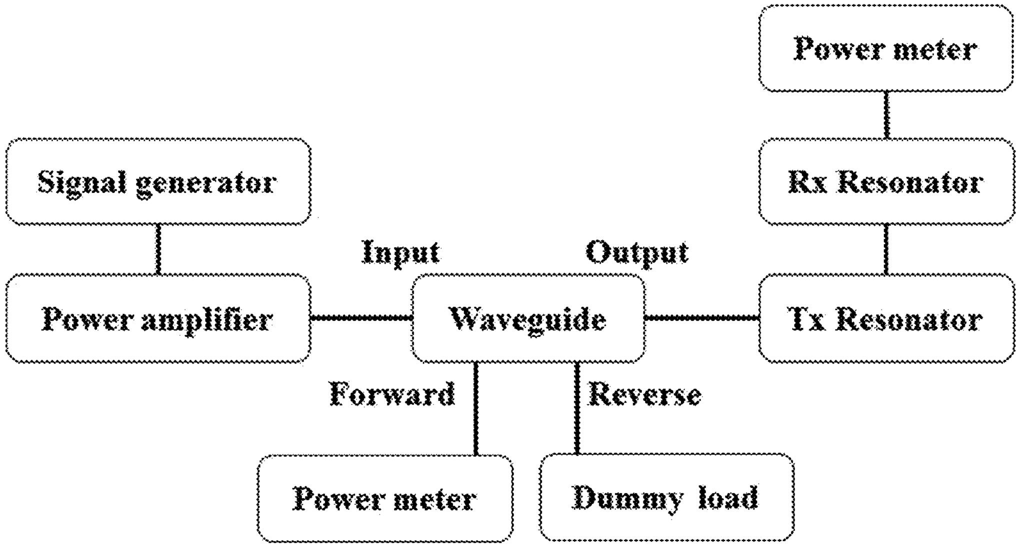
FIG. 8 is a block diagram for testing the thin film type resonator according to an embodiment of the present disclosure.
Figure 9A:
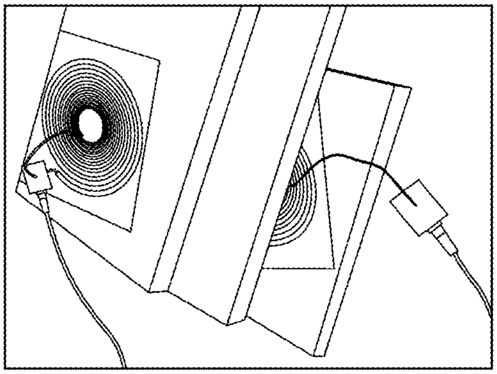
FIG. 9A, FIG. 9B, and FIG. 9C show a power transmission experiment using the thin film type resonator according to an embodiment of the present disclosure.
Figure 9B:
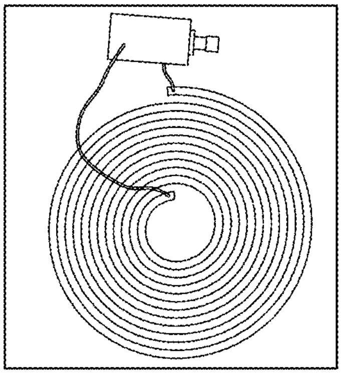
Figure 9C:
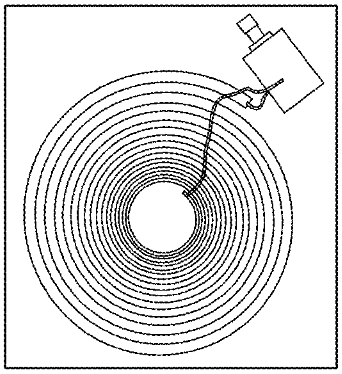

FIG. 8 is a block diagram for testing the thin film type resonator 100 according to an embodiment of the present disclosure, and FIG. 9A, FIG. 9B, and FIG. 9C show a power transmission experiment using the thin film type resonator 100 according to an embodiment of the present disclosure. FIG. 9A shows a power transmission experiment using the thin film type resonator 100, FIG. 9B shows a transmitter to which the thin film type resonator 100 is applied, and FIG. 9C shows a receiver to which the thin film type resonator 100 is applied.

Figure 10:
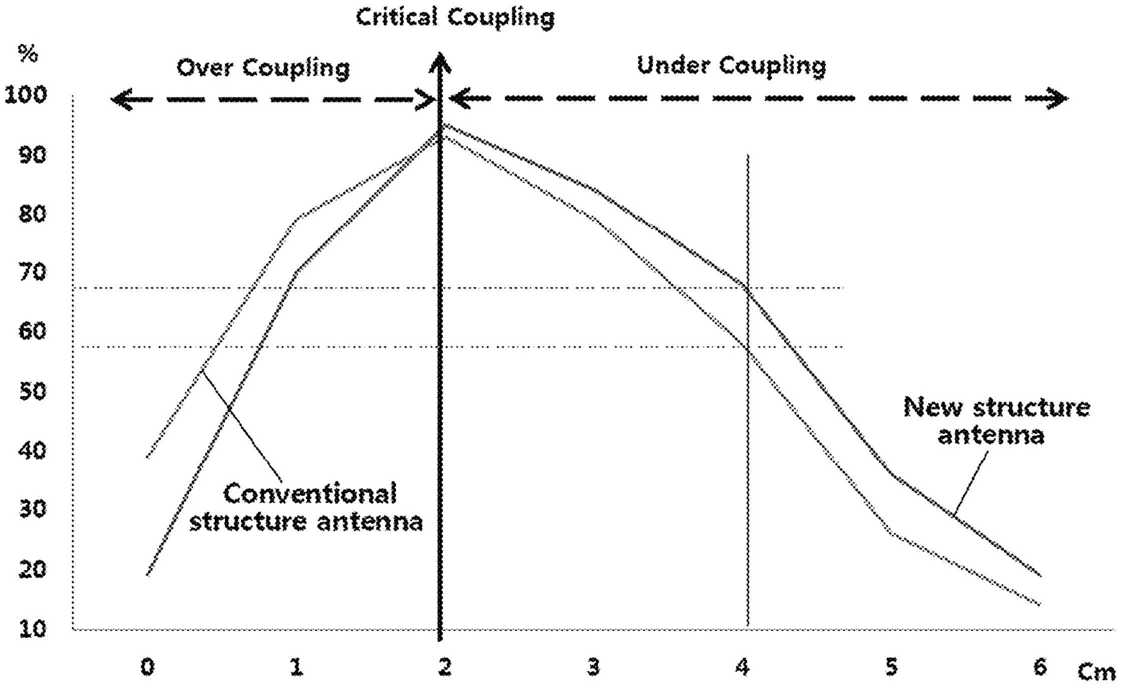
FIG. 10 is a graph showing the power transfer efficiency of the receiving resonator.

FIG. 10 is a graph showing the power transfer efficiency of the receiving resonator. As shown in FIG. 10, it can be seen that the power transfer efficiency of the tapered type receiving resonator according to the present disclosure is about 10% higher than that of the conventional receiving resonator. Although in the over-coupling region the power transfer efficiency of the receiving resonator according to the present disclosure is lower than that of the conventional receiving resonator, in the under-coupling region the power transfer efficiency of the receiving resonator according to the present disclosure is higher than that of the conventional receiving resonator. This can sufficiently overcome low power transfer efficiency in the over-coupling region.

Figure 11:
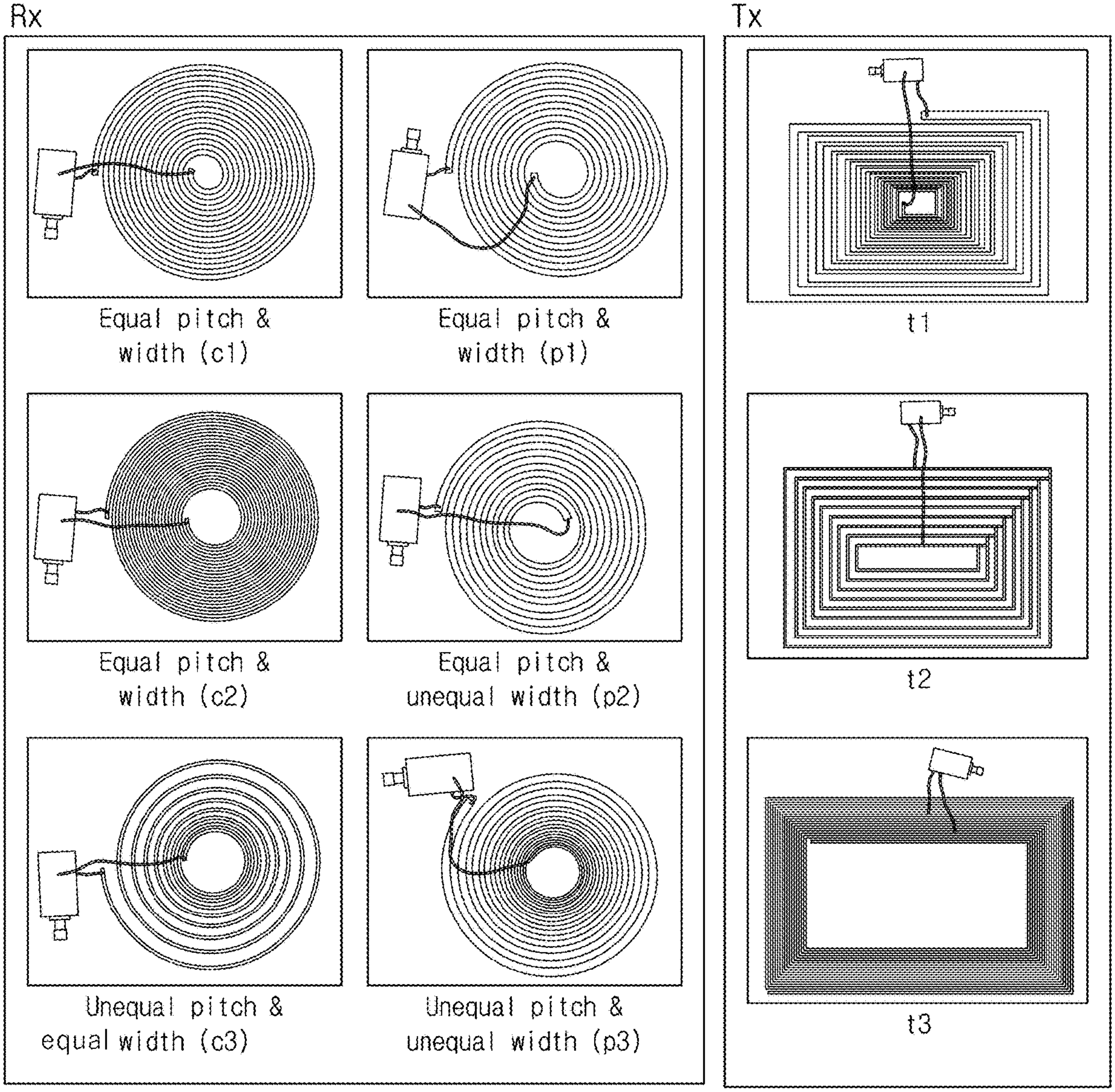
FIG. 11 shows thin film type resonators manufactured in various form factors, according to an embodiment of the present disclosure.

FIG. 11 shows thin film type resonators 100 manufactured in various form factors, according to an embodiment of the present disclosure. In FIG. 11, type c1 and type c2 have the same pitch and width, but there is a difference in the number of turns.

FIG. 12A-FIG. 12C show tables showing parasitic components and quality factors according to form factor. FIG. 12A shows the parasitic component (R) and the quality factor (Q) according to the form factor of a coil receiving resonator, FIG. 12B shows the parasitic component (R) and the quality factor (Q) according to the form factor of a printed receiving resonator, and FIG. 12C shows the parasitic component (R) and the quality factor (Q) according to the form factor of a printed transmitting resonator.

Figure 13:
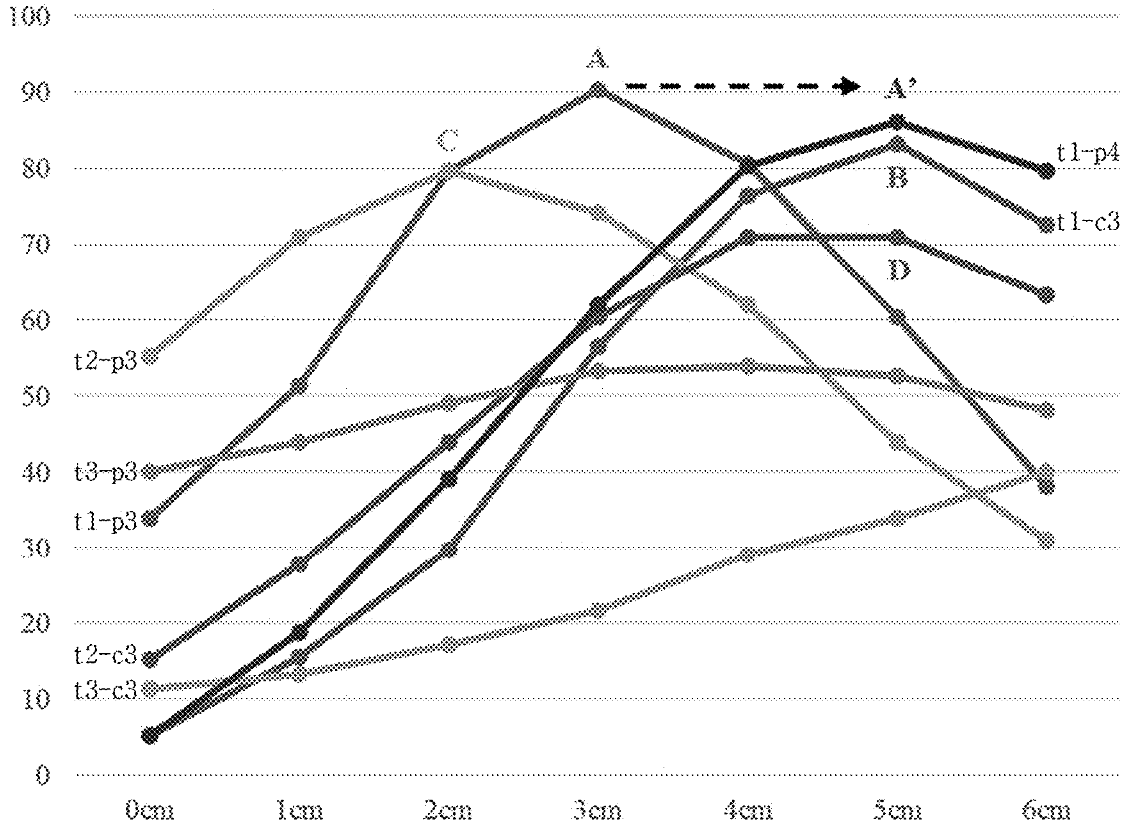
FIG. 13 is a graph showing the power transfer efficiency of a printed tapered type resonator according to an embodiment of the present disclosure.

FIG. 13 is a graph showing that the power transfer efficiency of the printed tapered type resonator according to the present disclosure is the highest among various transmitting and receiving resonators as shown in FIG. 12A-FIG. 12C. Here, point A' indicates that the transmission distance is extended by adjusting the form factor of the printed tapered type resonator at point A, which is the highest power transfer efficiency.

Figure 14:
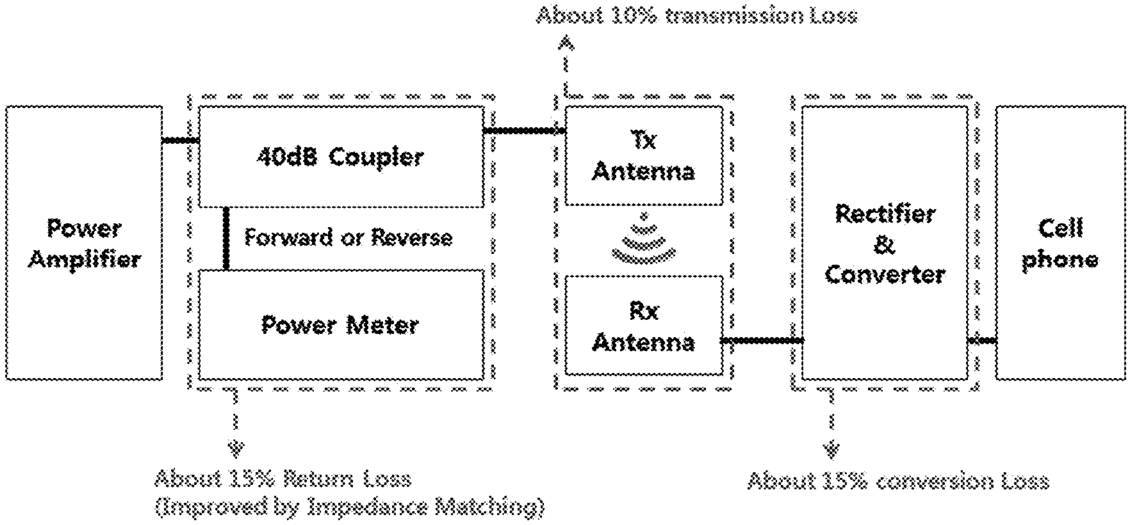
FIG. 14 is a block diagram showing an example of the thin film type resonator applied to a mobile phone wireless power transmission system, according to an embodiment of the present disclosure.

FIG. 14 is a block diagram showing an example of the thin film type resonator applied to a transmitting (Tx) antenna and a receiving (Rx) antenna of a mobile phone wireless power transmission system, according to an embodiment of the present disclosure.

For example, if the input power is 2.7 W (0.3 mw×10,000 (40 db coupler)–0.5 db (40 db coupler loss)), the charging power through the mobile phone wireless power transmission system as shown in FIG. 14 was 1.75 W (2.7 W (incident power)×0.85 (return loss)×0.85 (power conversion loss), exhibiting a transmission efficiency of 65%.

Figure 15:
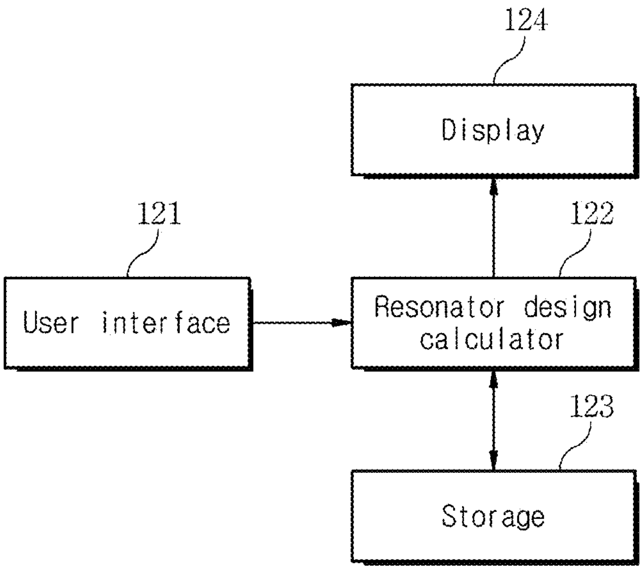
FIG. 15 is a block diagram showing a device for designing the thin film type resonator according to an embodiment of the present disclosure.

FIG. 15 is a block diagram showing a device for designing the thin film type resonator according to an embodiment of the present disclosure. As shown, the designing device includes a user interface 121, a resonator design calculator 122, a storage 123, and a display 124.

The user interface 121 inputs user setting information for designing the thin film type resonator 100 according to a user's request. The user setting information may include the outermost diameter of the thin film type resonator 100, outline selection information such as circular, rectangular, or polygonal outline, and the like.

Based on the information input through the user interface 121, the resonator design calculator 122 calculates the width (w), pitch (s), unequal factor (k), innermost radius (b), etc. suitable for satisfying the optimal quality factor.

The storage 123 stores information needed by the resonator design calculator 122 to design the thin film type resonator 100.

The display 124 displays information for the resonator design calculator 122 to inform the user regarding the design of the thin film type resonator 100.

Figure 16:
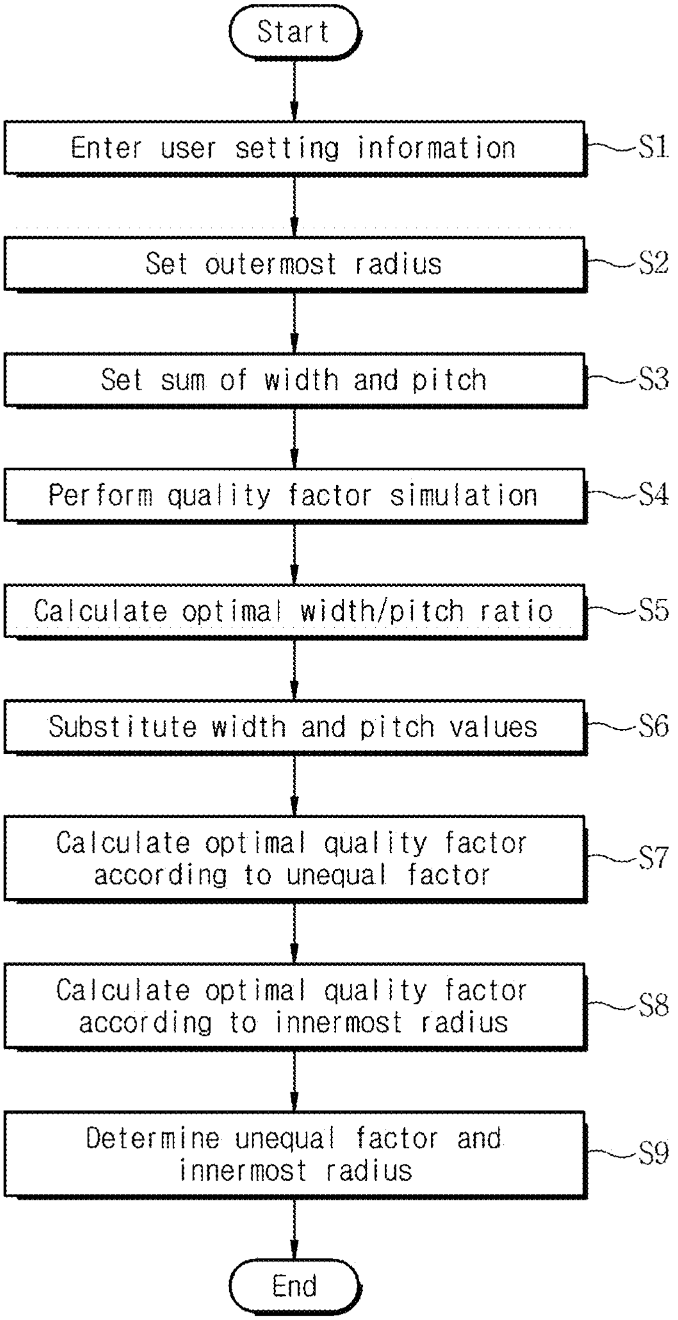
FIG. 16 is a flowchart showing a method of designing the thin film type resonator according to an embodiment of the present disclosure.

FIG. 16 is a flowchart showing a method of designing the thin film type resonator according to an embodiment of the present disclosure.

Referring to FIG. 16, the method of designing thin film type resonator according to the present disclosure includes a user setting information input step (S1), basic form factor setting steps (S2-S5), and unequal resonator form factor setting steps (S6-S9).

Hereinafter, this design method will be described in detail with reference to FIGS. 4 and 15.

In the user setting information input step (S1), the resonator design calculator 122 enters user setting information for designing the thin film type resonator 100 through the user interface 121. For example, the user setting information may include the outermost diameter of the thin film type resonator 100, outline selection information such as circular, rectangular, or polygonal outline, and the like.

In the basic form factor setting steps (S2-S5), the resonator design calculator 122 sets the basic form factor of the thin film type resonator that satisfies the user setting information.

Specifically, in an outermost radius setting step (S2), the resonator design calculator 122 sets the outermost radius of the thin film type resonator 100 that satisfies the user setting information (e.g., outermost diameter). For example, the resonator design calculator 122 may set the outermost radius of the thin film type resonator 100 to 46 mm.

Additionally, in a step (S3) of setting the sum of width and pitch, the resonator design calculator 122 sets the sum of width and pitch to be constant so that the outermost radius of the thin film type resonator 100 does not change according to changes in width and pitch. For example, the resonator design calculator 122 may set the sum of width and pitch to 6 mm.

Additionally, in a quality factor simulation step (S4), the resonator design calculator 122 performs a quality factor simulation according to changes in the width and pitch of the thin film type resonator 100.

Additionally, in an optimal width/pitch ratio calculation step (S5), the resonator design calculator 122 calculates the optimal width/pitch ratio for the thin film type resonator 100.

Meanwhile, in the tapered unequal resonator form factor setting steps (S6-S9), the resonator design calculator 122 sets the tapered unequal resonator form factor by using the optimal width/pitch ratio for the thin film type resonator calculated as above.

Specifically, in a width and pitch substitution step (S6), the resonator design calculator 122 substitutes width and pitch values in a 1:1 ratio to the above calculation result of the optimal width/pitch ratio.

Additionally, in a step (S7) of calculating the optimal quality factor according to the unequal factor, the resonator design calculator 122 calculates the optimal quality factor while changing the unequal factor.

Additionally, in a step (S8) of calculating the optimal quality factor according to the innermost radius, the resonator design calculator 122 calculates the optimal quality factor while changing the innermost radius.

Ultimately, the resonator design calculator 122 finds an unequal factor that maximizes the quality factor while changing the innermost radius of the thin film type resonator 100 through the optimal quality factor calculation steps (S7 and S8).

Finally, in an unequal factor and innermost radius determination step (S9), the resonator design calculator 122 determines the unequal factor and the innermost radius that satisfy the optimal quality factor.

While the present disclosure has been particularly shown and described with reference to an exemplary embodiment thereof, it will be understood by those skilled in the art that various changes in form and details may be made therein without departing from the scope of the present disclosure as defined by the appended claims.

What is claimed is:

1. A thin film type resonator comprising:

a thin film line formed in a spiral shape, the thin film line having a form factor in which a width and a pitch of the thin film line gradually increase from an innermost portion to an outermost portion, wherein the width and pitch of the thin film line increase at the same rate from the innermost portion to the outermost portion.

2. The thin film type resonator of claim 1, wherein the thin film type resonator is formed on a substrate.

3. The thin film type resonator of claim 2, wherein the substrate includes a printed circuit board (PCB).

4. The thin film type resonator of claim 1, wherein the thin film type resonator has any one of circular, rectangular, or polygonal outlines.

5. The thin film type resonator of claim 1, wherein a thickness of the thin film line is maintained constant from the innermost portion to the outermost portion.

* * * * *